April 10, 1945.   C. A. CHAMBERLAIN   2,373,381
GASEOUS FUEL CONTROL
Original Filed Feb. 27, 1939
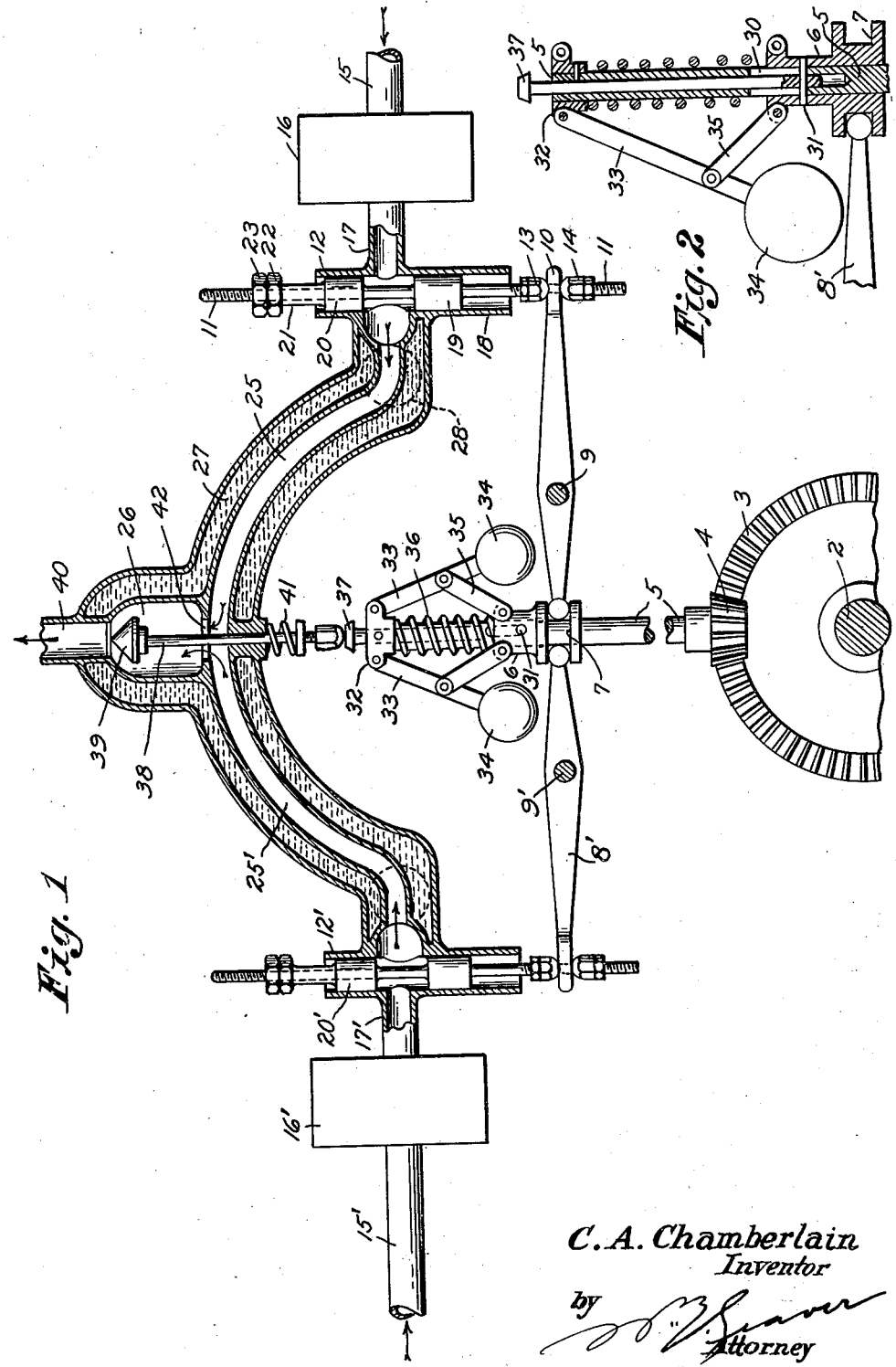
C. A. Chamberlain
Inventor Patented Apr. 10, 1945

2,373,381

UNITED STATES PATENT OFFICE 2,373,381

GASEOUS FUEL CONTROL

Chester A. Chamberlain, Brooklyn, N. Y.

Substituted for abandoned application Serial No. 258,814, February 27, 1939. This application September 28, 1944, Serial No. 556,221

8 Claims. (Cl. 123—100)

This invention relates to valves in general and more particularly to valves of the automobile cut-off type which are responsive operatively to a predetermined speed, the invention having for its object to provide such a valve structure which is simple in construction and more efficient in operation than those heretofore proposed.

With these and other objects in view the invention resides in the novel details of construction and combinations of parts as will be disclosed more fully hereinafter and particularly pointed out in the claims.

Referring to the accompanying drawing forming a part of this specification and in which like numerals designate like parts in all the views, Fig. 1 is a vertical sectional view illustrating the invention; and Fig. 2 is a fragmentary vertical sectional view through the governor.

This application is a refiling of my abandoned application Serial No. 258,814 filed February 27, 1939, entitled Gaseous fuel control.

The invention is illustrated for example only in connection with its application to an engine of the internal combustion type, and in the drawing 2 represents the engine shaft to which is secured a ring gear 3 enmeshed with a pinion 4 secured to a second shaft 5 suitably secured in bearings (not illustrated for the sake of simplicity) against axial movement and having slidably mounted thereon a collar 6 provided with an annular groove 7 in which is disposed the ball end of a lever 8 pivotally mounted as at 9 to some stationary portion of the engine, the other end 10 of said lever preferably being forked or bifurcated in order to straddle the stem 11 of a fuel cut-off valve generally identified by the numeral 12. Bearing nuts 13 and 14 are threaded on said stem for coengagement with the forked end of said lever.

At 15 is indicated a conduit for conveying a gaseous fuel in the direction of the arrow from a suitable source under high pressure, said conduit leading to a pressure reducing valve generally identified by the numeral 16 of any suitable type and from which the fuel passes under operating pressure as through the conduit 17 to the cut-off valve 12.

The cut-off valve comprises a cylinder 18 in which reciprocates a piston 19 carried by the stem 11, said piston normally occupying the position shown in the cylinder below the juncture of said cylinder and the conduit 17. The stem 11 is continued upwardly through the cylinder and has mounted thereon a second piston 20 normally above said juncture and having a sleeve-like upward extension 21 the upper end of which is internally threaded to coengage corresponding threads on the upper extremity of the stem 11, said sleeve 21 being shown as provided with a nut-like formation 22 which, when engaged with a suitable wrench, will permit of adjustment of the piston 20 toward or away from the other piston 19, a lock nut 23 being provided to jam the nut 22 and secure the piston 20 in its adjusted position upon said stem. The separation distance between the two pistons is made slightly more than the internal diameter of the conduit 17, the lower piston 19 serving as a bearing for the valve stem in its cylinder, the upper piston 20 serving to close the conduit 17 when said valve stem is moved downwardly by the rocking of lever 8 in a manner presently to be described.

The cut-off valve 12 has its cylinder 18 preferably supported on a stationary part of the engine and on the side of said cylinder opposite the conduit 17 there is formed the duct 25 leading to a mixing chamber generally identified by the numeral 26, which mixing chamber is substantially coaxial with the governor shaft 5. This duct 25 communicates with the interior of the cylinder 18 at a point in the same transverse plane of said cylinder with the conduit 17, whereby gaseous fuel from the latter may readily cross said cylinder and enter said duct, preferably the internal diameter of said duct being enlarged as shown where it joins said cylinder. Said duct and said mixing chamber are water jacketed as indicated at 27, the liquid for this purpose being received as through a connection 28 (indicated by the dotted circle) with the water jacket of the engine (not shown but readily understood).

The governor shaft 5 has a longitudinally extending slot 30 cut therethrough for receiving and limiting the movement of a pin 31 carried by the collar 6 wherefore it will be understood that said collar will rotate with said shaft and be capable of axial movement thereon within the limits of the extent of said slot. The upper end of said shaft has secured thereto a cap member 32 to which are pivotally secured a plurality of arms such as 33 carrying balls or weights such as 34, said arms pivotally connected with said collar as by the links 35, thereby establishing a simple and well known ball governor mechanism, a spring 36 being disposed about said shaft between said cap and collar.

The upper end of the governor shaft is axially bored to receive therein a push rod, whose lower end has the pin 31 disposed therethrough, and whose upper end has the head 37 for frictionally contacting the lower end of a valve stem 38 having the valve head 39 at its upper extremity, said valve head being disposed in the mixing chamber 26 and adapted, when moved upwardly, to close the outlet conduit 40 leading from said chamber to an intake manifold of the engine. A spring 41 is disposed about the valve stem 38 and exerts a pressure normally tending to keep the valve head 39 in open position as shown.

The gas feed and cut-off heretofore described are duplicated in order to control and feed a different gaseous fuel to the mixing chamber where it mixes with the gaseous fuel from the conduit 15. It other words, there is a conduit 15' joined to a pressure reducing valve 16' communicating with the conduit 17' for leading the second and different gaseous fuel to and through the cut-off valve 12' and into the duct 25' in the direction of the arrow to the mixing chamber, the ducts 25 and 25' intercommunicating at the opening 42 into the mixing chamber. The cut-off valve 12' is a substantial duplicate of the cut-off valve 12 in that it has a cylinder and pistons and stem similar to those previously described and which are actuated by a lever 8' which is similar to the lever 8.

From the foregoing description it will therefore be understood that when the engine is at rest or operating at reduced speeds, the parts of this mechanism will be substantially in the positions shown in the drawing, but when the engine speed increases there will be a corresponding increase in revolution of the governor shaft 5 which in turn will cause an outward centrifugal movement of the governor weights or balls such as 34, and at extremely high engine speeds the outward movement of said balls will cause an upward sliding of the collar 6 resulting in the rocking of the pivoted levers 8 and 8' to cause a downward movement of the pistons 20 and 20' to shut off flow of gaseous fuel in either or both of conduits 17 and 17', at which time the valve head 39 will have been moved upwardly to prevent passage of the mixed gases from the mixing chamber 26 into the conduit 40 to the engine, thereby tending to stop the engine.

However, as soon as the revolutions of the engine shaft have decreased sufficiently to permit reverse operation of the governor device (as well understood), the valve head 39 will move downwardly under the urge of the spring 41 and the spring 36 will have caused a corresponding downward movement of the collar 6 with coincidental opposite rocking of the levers 8 and 8' and corresponding upward movement of the pistons 20 and 20' to uncover the gas conduits 17 and 17' whereupon fuel can again reach the mixing chamber, and the admixed fuel can pass from said chamber to the combustion cylinders of the engine and thus resume operative functioning of the engine. Therefore it will be seen that this mechanism in reality constitutes a speed governor and the tension of the various springs, the leverage of the levers 8 and 8', and the adjustments of the cut-off valves, as well as the gear ratio between the ring gear 3 and pinion 4, can all be changed and/or made of predetermined relationships to meet most any desired high speed of the engine, and yet permit operative functioning of the engine at all speeds up to the predetermined high speed. The predetermined engine high speed is synonymous with a predetermined rate of gas flow through the mixing chamber.

Whereas in the drawing the cut-off valves 12 and 12' and the ducts 25 and 25' leading therefrom are indicated as being diametrically opposed to each other, or disposed 180° apart, it is to be understood that this showing was only for the purpose of clearly illustrating the construction and operation of these parts. That is to say, the disposition of said cut-off valves can be at angles less than 180°. Also it is desired pointed out that the levers 8 and 8' need not necessarily be identical, for obviously their pivots can be differently disposed so that one lever will cause complete cut-off of one gaseous fuel before complete cut-off of the other gaseous fuel, thereby resulting in a different mixture of the two fuels or a choking effect at the time that the predetermined maximum high speed is reached and the valve 39 becomes closed.

It is not desired to be limited to any specific gases capable of serving as fuel, nor to be limited to any specific proportion of the two gaseous fuels. Neither is it to be understood that this particular governing device can be used with internal combustion engines alone since it is conceivable that this device is capable of utilization wherever a plurality of gaseous fuels are to be admixed for power developing or other purposes, the only limitation intended being that the feeding of the mixed gases shall be cut-off when a predetermined number of revolutions per minute are attained by the power device actuated by the admixed gases.

It is obvious that those skilled in the art may vary the details of construction and arrangements of parts without departing from the spirit of this invention and therefore it is desired not to be limited to the exact foregoing disclosure except as may be demanded by the claims.

What is claimed is:

1. In a fuel feed mechanism for an engine, the combination of a shaft receiving power from the engine; a plurality of fuel conveying conduits, one conduit for each of a plurality of different fuels; a cut-off valve in each conduit; a mixing chamber receiving fuel from each conduit and mixing the same with the fuel from another conduit; an outlet from said chamber for the admixed fuels; a valve to close said outlet conduit, said valve operatively connected to said shaft; and means slidable on said shaft and responsive to the speed thereof to actuate all of said valves.

2. In a fuel feed mechanism for an engine, the combination of a shaft receiving power from the engine; a plurality of fuel conveying conduits, one conduit for each of a plurality of different fuels; a cut-off valve in each conduit; a mixing chamber receiving fuel from each conduit and mixing the same with the fuel from another conduit; an outlet conduit from said chamber for the admixed fuels; a valve to close said outlet conduit, said valve having a stem in prolongation of and contacting said shaft; and means slidable on said shaft and responsive to the speed thereof to actuate all of said valves.

3. In a fuel feed mechanism for an engine the combination of a shaft receiving power from the engine; a plurality of fuel conveying conduits, one conduit for each of a plurality of different fuels; a cut-off valve in each conduit; a mixing chamber receiving fuel from said conduit and mixing the same with the fuel from another conduit; an outlet conduit from said chamber for the admixed fuels; a valve to close said outlet conduit, said valve operatively connected to said shaft; and means slidable with respect to said shaft and responsive to the speed thereof to actuate all of said valves.

4. In a fuel feed mechanism for an engine the combination of a shaft receiving power from the engine; a plurality of fuel conveying conduits, one conduit for each of a plurality of different fuels; a cut-off valve in each conduit; a mixing chamber receiving fuel from each conduit and mixing the same with the fuel from another conduit; an outlet conduit from said chamber for the admixed fuels; a valve to close said outlet conduit, said valve operatively connected to said shaft; and means to actuate all of said valves, said means including a member carried by said shaft and slidingly responsive to the speed thereof.

5. In a fuel feed mechanism for an engine the combination of a shaft receiving power from the engine; a plurality of fuel conveying conduits, one conduit for each of a plurality of different fuels; a cut-off valve in each conduit; a mixing chamber receiving fuel from each conduit and mixing the same with the fuel from another conduit; an outlet conduit from said chamber for the admixed fuels; a valve to close said outlet conduit, said valve operatively connected to said shaft; and means to actuate all of said valves, said means including a member carried by said shaft and slidingly responsive to the speed thereof, as well as levers actuated by said member.

6. In a fuel feed mechanism for an engine the combination of a shaft receiving power from the engine; a plurality of fuel conveying conduits, one conduit for each of a plurality of different fuels; a cut-off valve in each conduit; a mixing chamber receiving fuel from each conduit and mixing the same with the fuel from another conduit; an outlet conduit from said chamber for the admixed fuels; a valve to close said outlet conduit, said valve operatively connected to said shaft; and means to actuate all of said valves, said means including a member carried by said shaft and slidingly responsive to the speed thereof, as well as levers actuated by said member, one lever for each cut-off valve.

7. In a fuel feed mechanism for an engine the combination of a shaft receiving power from the engine; a plurality of fuel conveying conduits, one conduit for each of a plurality of different fuels; a cut-off valve in each conduit; a mixing chamber receiving fuel from each conduit and mixing the same with the fuel from another conduit; an outlet conduit from said chamber for the admixed fuels; a valve to close said outlet conduit, said valve operatively connected to said shaft; and means to actuate all of said valves, said means including a member carried by said shaft and slidingly responsive to the speed thereof, as well as a push rod telescopically associated with said shaft and actuated by said member.

8. In a fuel feed mechanism for an engine the combination of a shaft receiving power from the engine; a plurality of fuel conveying conduits, one conduit for each of a plurality of different fuels; a cut-off valve in each conduit; a mixing chamber receiving fuel from each conduit and mixing the same with the fuel from another conduit; an outlet from said chamber for the admixed fuels; a valve to close said outlet conduit, said valve operatively connected to said shaft; and means to actuate all of said valves, said means including a member carried by said shaft and slidingly responsive to the speed thereof, as well as a telescopic portion of said shaft and levers actuated by said members.

CHESTER A. CHAMBERLAIN.